United States Patent
Sabanovic et al.

(10) Patent No.: US 8,024,968 B2
(45) Date of Patent: Sep. 27, 2011

(54) APPARATUS AND METHOD FOR DETECTING INK IN A RESERVOIR

(75) Inventors: Mirza Sabanovic, Portland, OR (US); David L. Knierim, Wilsonville, OR (US); Michael Kenneth Oehl, Beaverton, OR (US)

(73) Assignee: Xerox Corporation, Norwalk, CT (US)

(*) Notice: Subject to any disclaimer, the term of this patent is extended or adjusted under 35 U.S.C. 154(b) by 451 days.

(21) Appl. No.: 12/364,257

(22) Filed: Feb. 2, 2009

(65) Prior Publication Data

US 2010/0192685 A1    Aug. 5, 2010

(51) Int. Cl.
*G01F 23/00* (2006.01)

(52) U.S. Cl. .................................... 73/290 R

(58) Field of Classification Search ............... 73/290 R, 73/292, 295; 347/7
See application file for complete search history.

(56) References Cited

U.S. PATENT DOCUMENTS

| | | | |
|---|---|---|---|
| 5,781,205 A * | 7/1998 | Silverbrook ................ 347/17 |
| 5,920,332 A | 7/1999 | Brooks |
| 6,059,406 A | 5/2000 | Richtsmeier et al. |
| 6,637,865 B1 * | 10/2003 | Murakami et al. ............ 347/56 |
| 2006/0080052 A1 | 4/2006 | Smith et al. |
| 2009/0027477 A1 | 1/2009 | Matsuo et al. |

FOREIGN PATENT DOCUMENTS

JP    5221002 A    8/1993

* cited by examiner

*Primary Examiner* — Hezron E Williams
*Assistant Examiner* — Rodney T Frank
(74) *Attorney, Agent, or Firm* — Maginot, Moore & Beck LLP (57) ABSTRACT

A method detects the level of ink in a printhead reservoir by monitoring the power drawn by a thermistor positioned within the printhead reservoir. The method includes dissipating power in a thermistor in an ink reservoir, controlling the power dissipated in the thermistor to maintain the thermistor at a temperature that is a fixed differential above a reservoir temperature, measuring a parameter that corresponds to the power dissipated in the thermistor, and comparing the measured parameter to a predetermined value to detect ink in the reservoir contacting the thermistor.

20 Claims, 5 Drawing Sheets

APPARATUS AND METHOD FOR DETECTING INK IN A RESERVOIR

TECHNICAL FIELD

The apparatus and method described below relates to detecting the level of ink remaining in a printer, and more particularly to using thermistors to detect the level of ink in a printhead reservoir.

BACKGROUND

Inkjet printers eject or "jet" small bursts of liquid ink from extremely fine nozzles to form an image on an image receiving surface, such as an intermediate transfer surface, or a media substrate, such as paper. The benefits of inkjet printing include low printing noise, low cost per printed page, and the ability to print "full color" images. Full color inkjet printers often utilize a printhead having four ink reservoirs, one for each color required to generate full color images; namely, cyan, magenta, yellow, and black.

Full color and monochromatic inkjet printers can be divided into two categories based on the properties of the ink ejected from the printhead. Aqueous inkjet printers utilize inks formed from a water soluble dye suspended in a polyhydric alcohol. Due to the alcohol base, aqueous inks remain in a liquid phase at room temperature. Therefore, aqueous inks are suitable for printing anytime the user activates the printer. Alternatively, phase change inkjet printers utilize ink that remains in a solid phase at room temperature, often having a waxy consistency. Before the solid ink printhead may eject phase change ink, the printhead must warm the ink to an operating temperature. As the ink reaches operating temperature it melts, or changes phase, allowing the ink to achieve a liquid consistency suitable for ejection by the printhead. The printer maintains at least a portion of the ink at an operating temperature while the printer is activated; however, when the printer is deactivated the ink begins to cool, eventually returning to the solid phase. Before the printer may print an image, the printhead must again melt at least a portion of the ink.

Inkjet printers utilizing either category of ink, often include a printhead having a comparatively small ink reservoir fluidly connected to a larger main ink reservoir. Likewise, full color printers include a printhead having four comparatively small ink reservoirs each fluidly connected to one of four larger main ink reservoirs. Each main ink reservoir receives solid ink, or houses a quantity of aqueous ink supplied by the user. The printer contains circuitry that doses portions of the ink in the main reservoir to the printhead reservoir. A two-stage reservoir system reduces the mass of the printhead, thereby conserving energy and increasing print speed. Additionally, systems utilizing solid ink benefit further because, the small ink reservoir on the printhead avoids the necessity of heating the entire supply of solid ink in the main reservoir for every print job. However, two-stage reservoir systems require the printer to monitor the quantity of ink within the printhead reservoir closely, because if the printhead completely drains the reservoir during the imaging process, the desired image will not be properly formed.

Various methods exist to monitor the supply of ink in the printhead reservoir. One method counts the number of ink drops ejected by the printhead nozzle. Ink drop counting works well and provides the printer's electronic controller with a continuously variable ink level signal ranging from empty to full; however, the system does not provide a real-time monitoring of the actual level of ink in the printhead. Another method utilizes a pair of electrodes immersed within the printhead reservoir. Circuitry monitors the electrical resistance of the ink, and as the ink level changes, so does the resistance measured across the electrodes. Ink resistance monitoring also works well, but only when the printer utilizes an ink with a measurable conductivity. Therefore, further developments in the area of ink level sensing would be desirable.

SUMMARY

A new method for detecting the level of ink in a printhead reservoir monitors the power drawn by a thermistor positioned within the printhead reservoir. The method includes dissipating power in a thermistor in an ink reservoir, controlling the power dissipated in the thermistor to maintain the thermistor at a temperature that is a fixed differential above a reservoir temperature, measuring a parameter that corresponds to the power dissipated in the thermistor, and comparing the measured parameter to a predetermined value to detect ink in the reservoir contacting the thermistor.

A system may be implemented in a printer that detects ink in a printhead reservoir by monitoring the power drawn by a thermistor positioned within the printhead reservoir. An ink level detection system may utilize the method to facilitate detecting the level of ink in a printhead reservoir. The ink level detection system includes a thermistor positioned within an ink reservoir of a printer, a switch configured to couple a voltage to the thermistor in response to a control signal being received at the switch, a comparator having one input coupled to a voltage across the thermistor and another input coupled to a threshold voltage, the comparator generating the control signal received by the switch, and a digital controller coupled to the comparator and configured to measure a parameter corresponding to a dissipation of electrical power in the thermistor during a predetermined time period and to compare the measured parameter to a predetermined value to detect ink in the reservoir contacting the thermistor.

DETAILED DESCRIPTION

The word "printer" as used herein encompasses any apparatus, such as a digital copier, bookmaking machine, facsimile machine, multi-function machine, etc. which performs a print outputting function for any purpose. While the specification focuses on a system that detects the level of molten solid ink in a solid ink printhead, the method and apparatus for detecting ink in a reservoir may be used with any image generating device that detects a level of liquid ink. Furthermore, solid ink may be called or referred to herein as ink, ink sticks, or sticks.

Figure 1:
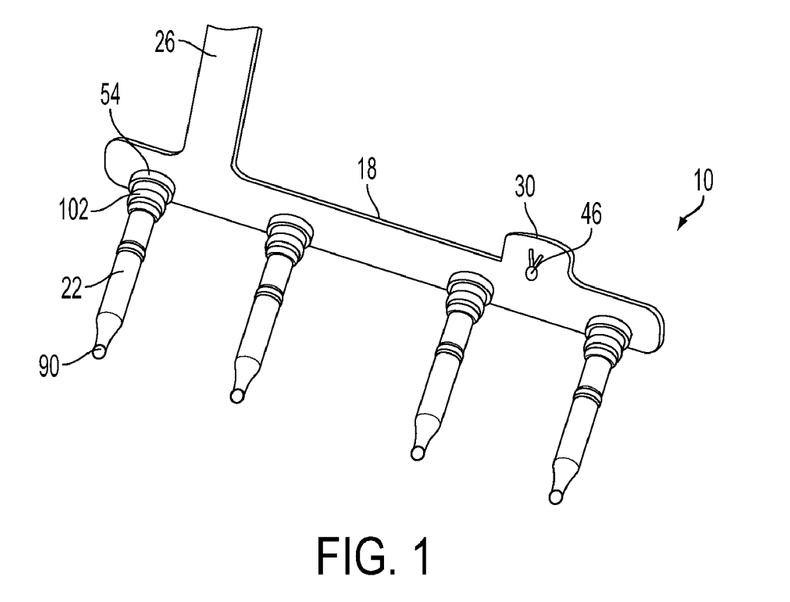
FIG. 1 depicts a perspective view of a thermistor probe assembly.
Figure 2:
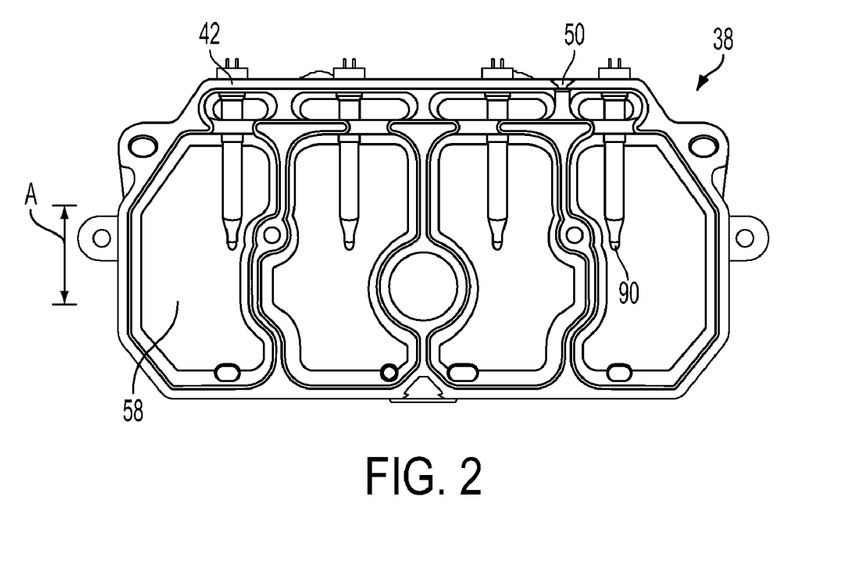
FIG. 2 depicts the thermistor probes of FIG. 1 secured to a printhead having four ink reservoirs.

As illustrated in FIG. 1, a support arm 18 connects the ink level detection system 10 to the printhead 38 (shown in FIG. 2). The support arm 18 includes a plurality of probes 22, a wire harness 26, a reference thermistor 30, and a plurality of ink level thermistors 34 (shown in FIG. 3). The support arm 18 is formed from materials capable of remaining rigid at temperatures in excess of the printhead 38 operating temperature, which may exceed 115° C. Suitable materials include, but are not limited to, polyimide. The support arm 18 is suitably dimensioned and shaped to position a probe for placement in each reservoir of a printhead 38.

With continued reference to FIG. 1, the support arm 18 includes a protrusion 46 upon which a reference thermistor 30 is secured. The protrusion 46 aligns the reference thermistor 30 with a cavity 50 in the printhead 38, as illustrated in FIG. 2. The cavity 50 has an opening slightly larger than the outside dimensions of the reference thermistor 30. The depth of the cavity 50 exceeds the distance that the reference thermistor 30 extends from the support arm 18. Alternatively, the depth may correspond to the distance the reference thermistor 30 extends from the support arm 18, such that the reference thermistor 30 contacts the printhead 38, when the support arm 18 is connected to the printhead 38. The protrusion 46 completely covers the cavity 50 opening, preventing ambient air from impacting the temperature reading obtained by the reference thermistor 30. The support arm 18 does not require a protrusion 46 when the cavity 50 is aligned with the ink reservoir openings 42, in which case the reference thermistor 30 may simply be secured directly to the support arm 18.

The support arm 18 includes receptors 54 to accept the probes 22. The receptors 54 are separated by a distance approximately equal to the distance between the ink reservoir openings 42, as illustrated in FIG. 2. Each receptor 54 is sized to engage the base of a probe 22. A channel (not illustrated) in the support arm 18 connects wire openings (not illustrated) in the receptors 54 to the wire harness 26. The wire harness 26 provides a path to route wires from the printhead 38 to the circuit board or boards upon which the ink level monitoring components are mounted. The support arm 18 and the wire harness 26 may be separate elements, or the support arm 18 may be combined with the wire harness 26 into a single element providing both functions.

FIG. 2 illustrates a vertical cross section of a solid ink printhead 38 designed to print full color images. The printhead 38 includes a plurality of ink reservoirs 58 with each reservoir having an ink reservoir opening 42. Each reservoir 58 is connected to a main reservoir (not illustrated) through a fill tube (not illustrated). When "full" the upper surface of the ink may reach the top of length A, shown in FIG. 2, and when "low" the upper surface of the ink may reach the bottom of length A. Thus, the tip of the probes 22 may at times be submerged in the ink, and at other times may occupy an air pocket above the upper surface of the ink. The printhead 38 also includes a heating element (not illustrated) that maintains the temperature of the printhead 38 at a relatively constant operating temperature. The operating temperature exceeds the temperature required to melt the solid ink contained in each reservoir 58.

Figure 3:
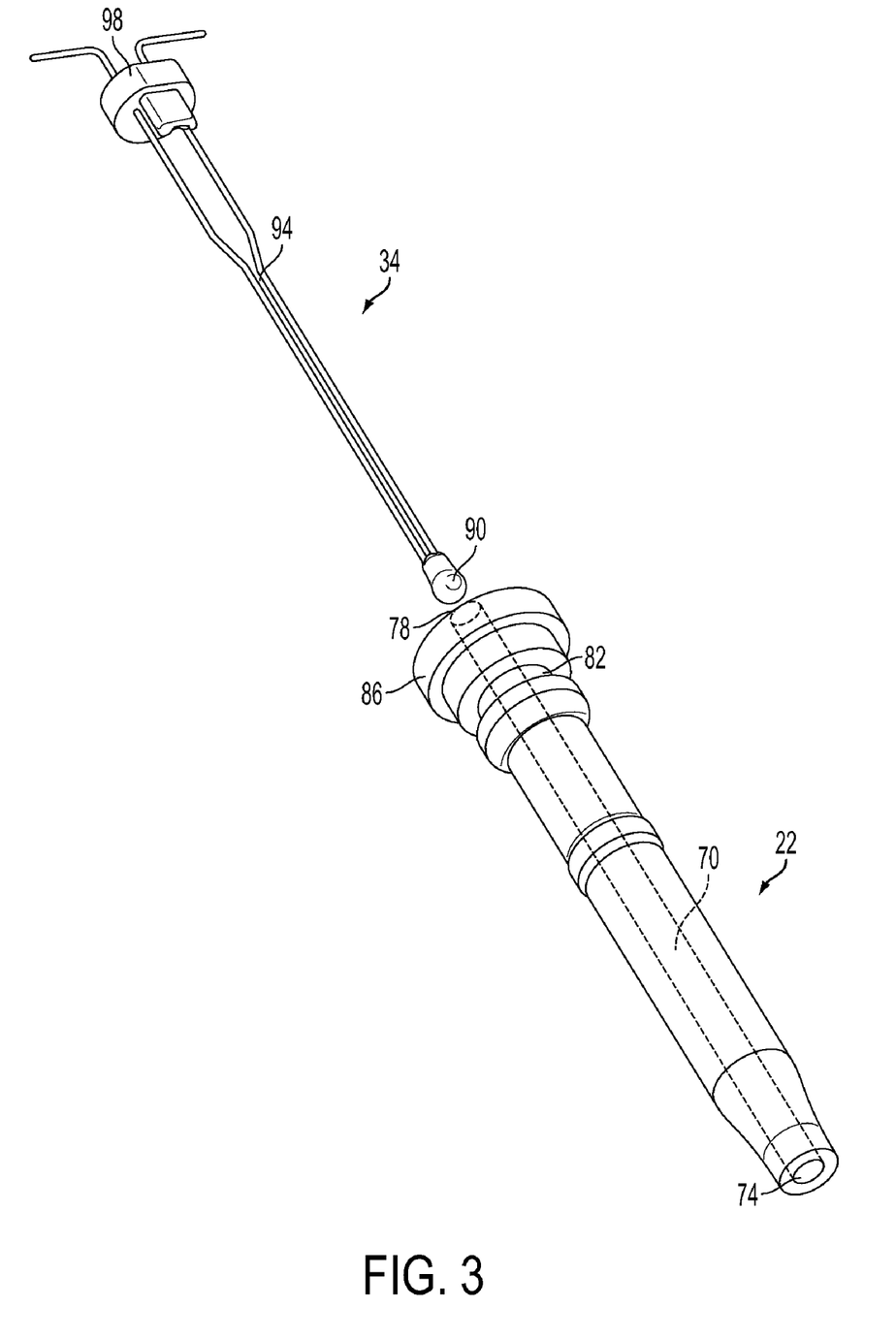
FIG. 3 depicts a perspective view of a thermistor and a thermistor probe.

A probe 22, as illustrated in FIGS. 1 to 3, is inserted through an ink reservoir opening 42 in the printhead 38. The probe 22 should be manufactured of a material that does not become excessively malleable when subject to the operating temperature of the printhead 38. Suitable probe 22 materials include, but are not limited to, polysulfone. As illustrated best in FIG. 3, the probe 22 may have a generally cylindrical shape with a tapered tip and a wide base, although other probe 22 configurations are possible. The probe 22 includes a hollow interior 70 (shown with dashed lines), a tip opening 74, a base opening 78, a channel 82, and a ridge 86. The interior 70 may be filled with an adhesive material, such as a primerless silicon adhesive, to prevent molten ink from entering the interior 70. The tip opening 74 permits a portion of the thermistor bead 90 to project therethrough, as shown in FIG. 1. The channel 82 accepts an o-ring 102, also illustrated in FIG. 1, that forms a seal between the probe 22 and the reservoir opening 42. The dimensions of the ridge 86 are larger than the reservoir opening 42, to form a second seal between the probe 22 and the reservoir opening 42. Thus, when the support arm 18 positions a probe 22 within the reservoir 58, ink does not leak from the opening 42.

The probe 22 houses an ink level thermistor 34, as illustrated best in FIG. 3. The thermistor 34 includes a bead 90, lead wires 94, and a wire separator 98. The bead 90 is the portion of the thermistor 34 sensitive to temperature change. The bead 90 houses a ceramic, polymer, or other material that changes electrical resistance in response to a change in temperature. The outside dimensions of the bead 90 are approximately equal to the inside dimension of the tip opening 74 to form a seal between the bead 90 and the tip opening 74. The seal, like the adhesive material, prevents molten ink from entering the interior 70. The lead wires 94 extend from the base opening 78 and are connected to wires that join the thermistor 34 to the ink level circuit 150 (shown in FIG. 4). The wire separator 98 ensures the lead wires 94 do not contact each other when the thermistor 34 is positioned within the probe 22. The outside dimensions of the wire separator 98 approximately match the inside dimensions of the base opening 78, thereby centering the lead wires 94 within the interior 70.

The material within the bead 90 has a negative temperature coefficient. Therefore, when the temperature of the thermistor 34 increases, the resistance of the material within the bead 90 decreases. Alternatively, when the temperature of the thermistor 34 decreases, the resistance of the material within the bead 90 increases. Although the method and system 10 are described as utilizing a thermistor 34 having a negative temperature coefficient, the system 10 may also be configured for use with a thermistor 34 having a positive temperature coefficient.

The portion of the bead 90 extending from the tip opening 74 is exposed to the ink within the reservoir 58; thus, the orientation of the probe 22 determines the position of the bead 90 within the ink reservoir 58. As illustrated in FIG. 2, the probe 22 may be vertically positioned within the ink reservoir 58, such that the length of the probe 22 determines the level of the bead 90 within the reservoir 58. When the upper surface of the ink drops the below the bead 90 the ink level detection system 10 indicates a low ink condition. Thus, as the probe 22 becomes longer a lesser quantity of ink triggers a low ink condition. The probe 22 may have a length that signals a low ink condition before the reservoir 58 is empty in order to give an ink delivery system enough time to replenish the reservoir 58 before the ink is completely drained.

Alternatively, the probe 22 may be horizontally mounted within the ink reservoir 58. When the probe 22 is horizontally mounted, the probe 22 length does not determine the ink level that triggers a low ink signal; instead, the vertical position of the ink reservoir opening 42 determines the ink level that triggers a low ink signal. When the opening 42 is close to the base of the ink reservoir 58 the ink delivery system has less time to replenish the ink reservoir 58 before it is completely drained, as compared to an arrangement having an opening 42 proximate the top of the ink reservoir 58.

Figure 4:
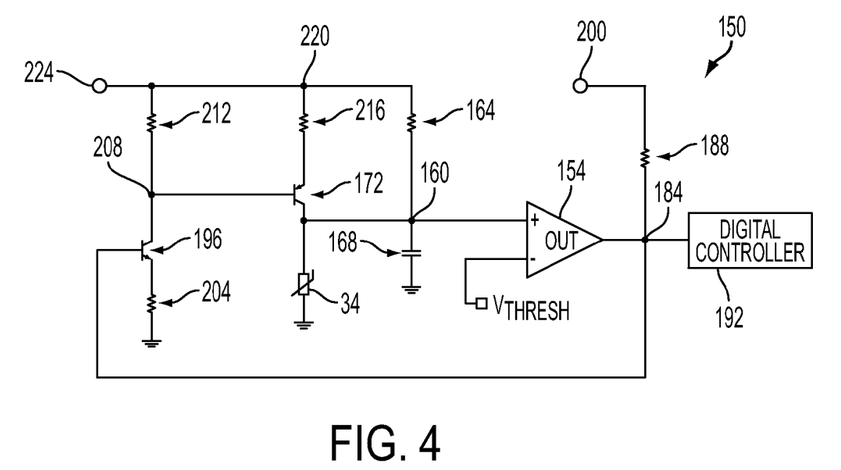
FIG. 4 depicts a schematic view of a circuit for detecting the ink level in an ink reservoir.

FIG. 4 shows an electronic circuit 150 for detecting the level of ink in a printhead reservoir 58, using the ink level detection system 10 described above. The circuit 150 includes an open-collector comparator 154 having a first input coupled to programmable threshold voltage level $V_{thresh}$. The second input of the comparator 154 is coupled to node 160, which shares a connection with a first resistor 164, a capacitor 168, the collector of a PNP bipolar junction transistor 172, and a thermistor 34 having a negative temperature coefficient. The capacitor 168 and the thermistor 34 are also connected to electrical ground. Likewise, the open collector output of the comparator 154 is coupled to node 184, which shares a connection with a second resistor 188, an input/output lead of a digital controller 192, and the base of an NPN bipolar junction transistor 196. The second resistor 188 is coupled to a control voltage, provided as a positive logic supply voltage 200. The emitter of the NPN transistor 196 is connected to a third resistor 204, which is coupled to ground. The collector of the NPN transistor 196 is coupled to node 208, which shares a connection with a fourth resistor 212 and the base of the PNP transistor 172. The emitter of the PNP transistor 172 is connected to a fifth resistor 216. The fifth resistor 216 is coupled to node 220, which shares a connection with the first resistor 164, the fourth resistor 212, and a positive source voltage 224 of, for example, twelve volts. Furthermore, the fifth resistor 216 has a comparatively low resistance when compared to the resistance of resistor 164.

The ink level thermistor 34 of circuit 150 is utilized in a "self heat" configuration. Of course, the thermistor 34 does not actually heat itself; rather, a heating voltage driven from supply voltage 224 through the comparatively low resistance of resistor 216, transistor 172, and across the resistance of the thermistor 34, heats the thermistor 34. Specifically, application of a twelve volt supply at node 224 with resistor 216 having a resistance of 100 ohms produces a heating voltage of approximately eleven volts across thermistor 34. Once thermistor 34 reaches a steady state threshold temperature, the heating voltage of eleven volts may generate a current of 7.5 milliamps through thermistor 34 in the circuit depicted in FIG. 4. Thus, unlike the reference thermistor 30, the temperature of the ink level thermistor 34 generally becomes greater than the temperature of the surrounding environment. Specifically, the ink level thermistor 34 is self heated to a threshold temperature, which equals a predetermined temperature differential plus the operating temperature of the printhead reservoir 38. In one embodiment, a temperature differential of 32° C. is utilized, although other temperature differentials work sufficiently well. The threshold temperature is controlled by a corresponding threshold voltage $V_{thresh}$.

Figure 5:
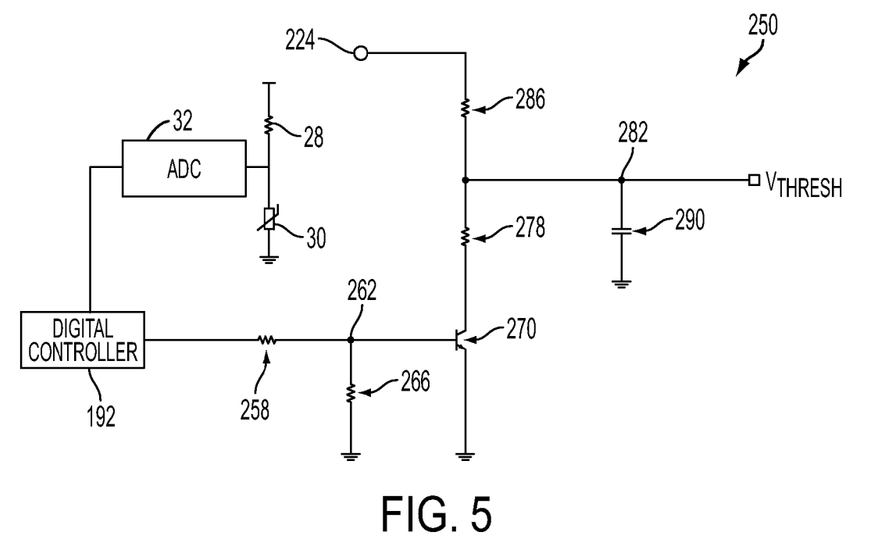
FIG. 5 depicts a schematic view of a circuit for generating a threshold voltage.

FIG. 5 shows a circuit 250 for generating the programmable threshold voltage $V_{thresh}$. Reference thermistor 30 is connected on one side to ground and on the other side to a pull-up resistor or current source 28. An input of analog to digital converter (ADC) 32 is coupled to the thermistor 30 and its output is coupled to an input lead of the digital controller 192, which may be provided as a microprocessor or a complex programmable logic device. An output lead of the digital controller 192 is connected to a first resistor 258. The first resistor 258 is connected to node 262, which shares a connection with a second resistor 266 and the base of an NPN bipolar junction transistor 270. The second resistor 266 and the emitter of the transistor 270 are connected to ground. The collector of the transistor 270 is connected to a third resistor 278. The third resistor 278 is connected to a node 282, which shares a connection with a fourth resistor 286 and a capacitor 290. The fourth resistor 286 is connected to the positive source voltage 224, which may be +12 volts, and the capacitor 290 is connected to ground. The threshold voltage $V_{thresh}$ is the voltage generated at node 282.

The circuit 250 of FIG. 5 implements a method for generating the threshold voltage $V_{thresh}$. As mentioned above, the threshold voltage $V_{thresh}$ is a voltage level that represents the temperature of the printhead 38 plus a predetermined temperature differential. When determining the threshold voltage $V_{thresh}$, the digital controller 192 monitors the voltage dropped across the resistance of the reference thermistor 30. Then, the digital controller 192 converts the monitored voltage drop to a reservoir temperature and adds the predetermined temperature differential to the converted reservoir temperature to arrive at the threshold temperature. Next, the digital controller 192 converts the threshold temperature to a corresponding threshold voltage $V_{thresh}$. Finally, the digital controller 192 generates a pulse width modulated ("PWM") voltage signal, which is applied to the base of transistor 270. By varying the duty cycle of the PWM signal, the digital controller 192 controls the current flow through transistor 270. The current through transistor 270 generates a voltage drop across resistors 278 and 286. The threshold voltage $V_{thresh}$ equals the voltage dropped across resistor 278 and transistor 270, as made available at node 282 by the PWM signal. Capacitor 290 filters the switching noise generated by the PWM signal from the threshold voltage $V_{thresh}$ so that the voltage is nearly constant. When the printer is activated, the digital controller 192 continuously monitors the temperature of the printhead 38 and updates the duty cycle of the PWM signal to maintain a precise threshold voltage $V_{thresh}$. As explained below, the threshold voltage $V_{thresh}$ is compared to the thermistor 34 voltage to determine when the thermistor 34 has reached the threshold temperature.

Figure 6:
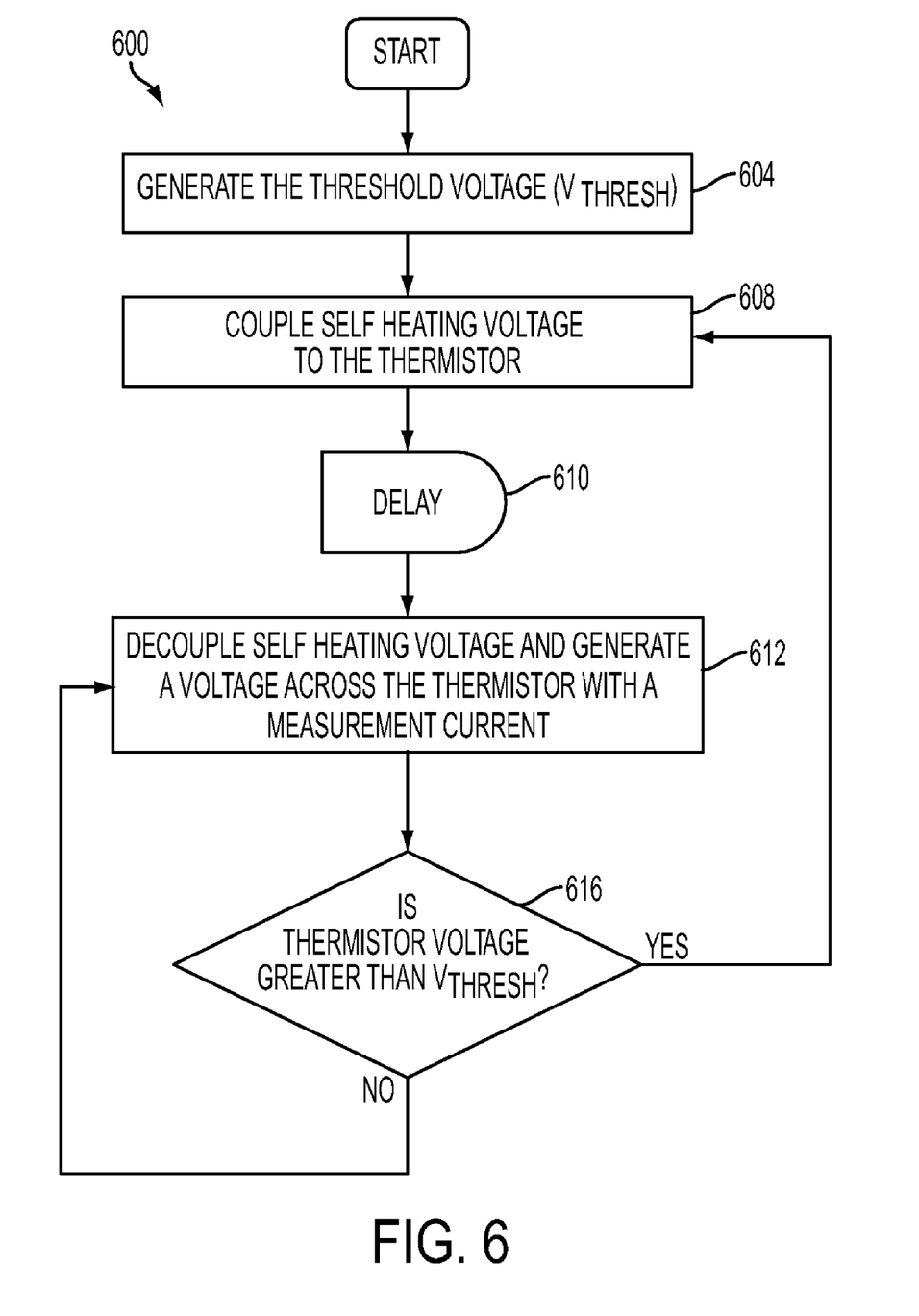
FIG. 6 depicts a flowchart illustrative of how a circuit implementing the ink level detection system heats a thermistor to a threshold temperature.

The flowchart of FIG. 6 illustrates a method 600 by which the ink level circuit 150 "self heats" the thermistor 34 to the threshold temperature. First, the digital controller 192 generates the threshold voltage $V_{thresh}$ and applies the voltage to the negative input of the comparator 154 (block 604). Because the ink within the reservoir 38 and the ink level thermistor 34 are initially at the same temperature, the voltage dropped across the thermistor 34 is much greater than the threshold voltage $V_{thresh}$. Thus, initially, the positive input of the comparator 154 is coupled to a larger voltage than the negative input. Therefore, the open collector output of the comparator 154 enters a high impendence off-state, which allows resistor 188 to raise the voltage level at node 184 to the positive logic supply voltage 200, which may be +3.3 volts. The voltage at node 184 forward biases the base-emitter junction of the NPN transistor 196 and enables current to flow from the source voltage 224 through resistor 212, the NPN transistor 196, and resistor 204 to electrical ground. The voltage at node 184, as determined by the positive logic supply voltage 200, is less than source voltage 224 to ensure the base-collector junction of NPN transistor 196 is reverse biased. NPN transistor 196 and resistor 204 generate a voltage drop at node 208, which is less than the source voltage 224. The voltage differential between node 220 and node 208 causes the base-emitter junction of the PNP transistor 172 to be forward biased. In normal operation, PNP transistor 172 is saturated when biased on and resistor 216 is of a relatively low value, such as 100 ohms, to enable node 160, which is the thermistor voltage, to be biased almost to the supply voltage 224. The limited voltage drop across resistor 212, 2.5 volts, for example, combined with resistor 216, prevents destructive current flow in the event of a short-circuit failure of thermistor 34. Therefore, resistor 216 and PNP transistor 172 couple a voltage to the thermistor 34 suitable to self heat the thermistor 34 (block 608), while limiting current in the event of a thermistor fault.

At predetermined periodic time intervals (block 610), the digital controller 192 interrupts the self heating of thermistor 34 by momentarily grounding node 184, thereby turning off transistors 196 and 172 (block 612). When transistor 172 turns off the thermistor 34 is no longer coupled to a heating voltage through low-impedance resistor 216. Instead, only a low measurement current flows through comparatively high-impedance resistor 164 and through the thermistor 34 (block 612). Specifically, resistor 164 may have a resistance of 2.49K ohms, which generates a current of 3 milliamps in the circuit of FIG. 4 once thermistor 34 reaches the steady state threshold temperature. The measurement current causes a voltage drop across thermistor 34 suitable for comparison with the threshold voltage $V_{thresh}$, and thus the current is herein termed a "measurement current." If the thermistor 34 voltage remains above the threshold voltage $V_{thresh}$, at the measurement current level, then the output of the comparator 154 remains in the high impedance off-state while the digital controller 192 momentarily grounds node 184, because the voltage level of the thermistor 34 indicates the temperature of the thermistor 34 is below the threshold temperature. Thus, after the digital controller 192 finishes momentarily grounding node 184, the node 184 quickly returns to the level of the positive logic supply voltage 200 causing transistors 196 and 172 to turn on once again, thereby heating the thermistor 34 with the self heating voltage (block 616). However, if after the digital controller 192 momentarily grounds node 184 the voltage dropped across the thermistor 34 is below the threshold voltage $V_{thresh}$, indicating the temperature of the thermistor 34 has exceeded the threshold temperature, the output of the comparator 154 enters the low impedance on-state while the digital controller 192 momentarily grounds node 184. Furthermore, even after the digital controller 192 finishes momentarily grounding node 184, the node 184 remains grounded by the low impedance output of the comparator 154, until voltage dropped across the thermistor 34 exceeds the threshold voltage $V_{thresh}$, indicating that the thermistor 34 has cooled to the threshold temperature (block 616). When the voltage dropped across the thermistor 34 equals $V_{thresh}$ the output of the comparator 154 enters the high impedance on-state, which once again heats the thermistor 34 by coupling the "self heating" voltage to the thermistor 34.

The process of heating and cooling the thermistor 34 in relation to the threshold voltage $V_{thresh}$ repeats indefinitely. Specifically, the circuit 150 causes the temperature of the ink level thermistor 34 to oscillate above and below the threshold temperature, with a range of approximately 0.02° C. Of course, the range is variable depending on the embodiment. When the temperature of the thermistor 34 has stabilized at the threshold temperature the ink level detection system 10 is ready to perform an ink level measurement.

The ink level detection system 10 determines if the surface level of the ink is above or below the thermistor bead 90 by counting a length of time power is delivered to the thermistor 34. The thermal conductivity of most inks is greater than that of air; thus, when the thermistor 34 is in the air pocket above the level of ink, the thermistor 34 requires less power to maintain the threshold temperature than when the thermistor 34 is submerged within the ink in the reservoir 58. The ink level detection system 10 determines the position of the ink relative to the position of the thermistor bead 90 by grounding the output stage of the comparator 154 for a first predetermined time, thereby causing the thermistor 34 to cool. Once the thermistor 34 cools to the threshold temperature the circuit 150 once again heats the thermistor 34. The digital controller 192 counts the heating time period as a length of time within a fixed measurement cycle that the thermistor 34 is heated. The length of the fixed measurement cycle is the sum of the first and second predetermined times. The counted length of the heating time period corresponds to the power required to maintain the thermistor 34 at the threshold temperature. The ink level circuit 150 compares the heating time period to stored values corresponding to a "full" or a "low" condition. If the heating time period corresponds to a "full" condition nothing more is done. If the heating time period corresponds to a "low" condition the ink level circuit 150 sends a signal to the printer controller indicating that ink needs to be delivered to the printhead reservoir 58 from the main ink reservoir.

Figure 7:
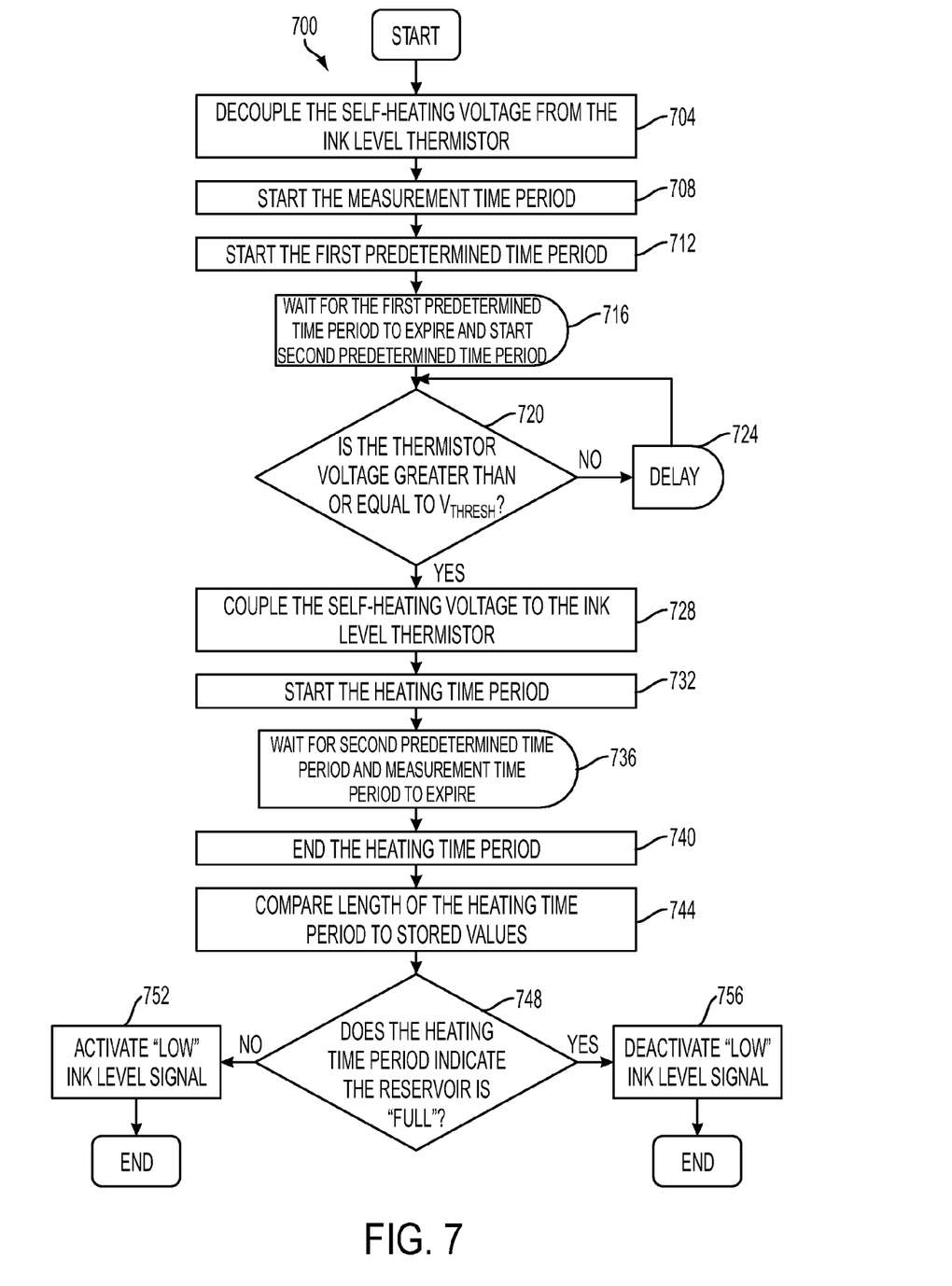
FIG. 7 depicts a flowchart illustrative of the method of detecting the ink level in an ink reservoir.

The flowchart of FIG. 7 illustrates a method 700 by which circuit 150 of FIG. 4 detects the level of ink in a printhead reservoir 58. Measurement cycles are initiated on a periodic basis, referred to as the measurement time period, which is the sum of the first and the second predetermined time periods. In one embodiment, the measurement time period may be two milliseconds; however, the length of the measurement time period depends on the circuit 150 components and the design of the printer. In the embodiment having a measurement time period of two milliseconds, the first predetermined time period is sixteen microseconds and the second predetermined time period is 1.984 milliseconds. The measurement time period represents a fixed time frame in which the digital controller 192 may successfully execute an ink level measurement. The results (heating time periods) from multiple, 200 for example, consecutive measurement time periods may be averaged together to reduce ink level measurement noise.

To begin the measurement cycle, the digital controller 192 grounds node 184 for a first predetermined time period, the beginning of which also marks the beginning of the measurement time period. When node 184 is grounded, transistors 196 and 172 enter cutoff mode, which prevents current from flowing through resistor 216 and PNP transistor 172. Thus the self-heating voltage is decoupled from the thermistor 34 causing the thermistor to cool (block 704). Thus, only the low measurement current flows through the thermistor 34. On the same clock cycle that the digital controller 192 grounds node 184, the controller starts counting the first predetermined time period and the measurement time period (blocks 708, 712). In one embodiment, the first predetermined time period may be approximately sixteen microseconds; however, other first predetermined time periods may be utilized depending on the type of thermistor 34, the magnitude of the supply voltage 224, the size of the reservoir 58, the position of the thermistor 34 within the reservoir 58, and the type of ink within the reservoir 58.

At the expiration of the first predetermined time period, the digital controller 192 releases node 184 from ground (block 716) and starts counting the second predetermined time period. If the first predetermined time period provided the thermistor 34 voltage sufficient time to exceed the threshold voltage $V_{thresh}$, the comparator 154 output enters the high impedance off-state almost immediately after the digital controller 192 releases node 184 from ground, thereby allowing the logic supply voltage 200 to turn on transistor 196 and saturate transistor 172 (block 720). When transistor 172 saturates, the voltage applied to node 160 to self heat the thermistor 34 causing its resistance to decrease (block 728). As soon as the comparator 154 enters the high impedance off-state the digital controller 192 starts counting a time period referred to as the heating time period, as explained below (block 732).

However, if the first predetermined time period did not provide sufficient time to allow the thermistor 34 voltage to exceed the threshold voltage $V_{thresh}$, the comparator 154 output remains in the low impedance on-state after the first predetermined time period has expired, which causes the transistors 196 and 172 to remain cutoff (block 720). Of course, when the transistors 196, 172 are cutoff only the measurement current is driven through the thermistor 34, thereby providing the thermistor 34 with additional time to cool (block 724). As the thermistor 34 continues to cool, the voltage dropped across the thermistor 34 continues to rise. When the thermistor 34 voltage reaches the threshold voltage $V_{thresh}$, comparator 154 enters the high impedance off-state, which causes the thermistor 34 to resume self-heating (block 720, 728). As soon as the comparator 154 enters the off-state, the digital controller 192 starts counting the heating time period (block 732).

The ink level detection system enables the heating time period to be used to determine the power required to heat the thermistor 34 to the threshold temperature. The beginning of the heating time period may be initiated in two situations. First, the heating time period may be initiated immediately at the expiration of the first predetermined time period, if the thermistor 34 voltage exceeded the threshold voltage $V_{thresh}$ during the first predetermined time period. The resulting "lengthy" heating time period usually indicates the thermistor bead 90 is submerged in ink. Specifically, more power is required to maintain the thermistor 34 at the threshold temperature when it is submerged in ink, because ink often has a greater thermal conductivity than air. A greater power requirement results in a longer heating time period. Second, the heating time period may be initiated when the thermistor 34 voltage reaches the threshold voltage $V_{thresh}$ sometime after the expiration of the first predetermined time period. The resulting "shorter" power demand time period usually indicates the thermistor bead 90 is suspended in an air pocket above the ink; therefore, less power is required to maintain the thermistor 34 at the threshold temperature.

To continue the discussion of the process in FIG. 7, the digital controller 192 compares the heating time period to values stored in a memory, such as a look-up table. These values are indicative of full and low ink reservoir conditions (block 744). If the heating time period indicates the ink level is low (block 748), the digital controller 192 activates a low ink level signal indicating that the printer electronic controller should supply the ink reservoir 58 with additional ink (block 752). If the heating time period corresponds to a full condition (block 748), the process 700 deactivates the low ink level signal (block 756). In either case, the process continues to maintain the thermistor 34 at the threshold temperature as described above. In another embodiment, the digital controller 192 records a predetermined number of heating time periods, and averages the heating time periods before comparing the length of the average heating time period to the stored values.

More broadly, the method described above dissipates power in a thermistor in an ink reservoir, controls the dissipated power to maintain the thermistor temperature at a fixed differential above the reservoir temperature, measures a parameter that corresponds to the dissipated power, and compares the measured parameter to a predetermined value to detect ink in the reservoir contacting the thermistor. In the described method, power is dissipated in the thermistor by coupling the heating voltage to the thermistor and the power dissipation is controlled by initiating the second predetermined time period on expiration of the first predetermined time period, comparing a voltage across the thermistor to a threshold voltage during the second predetermined time period, coupling the heating voltage to the thermistor upon detection of the thermistor voltage exceeding the threshold voltage during the second predetermined time period, and decoupling the heating voltage from the thermistor on expiration of the second predetermined time period. The power dissipation control and the monitoring of the thermistor voltage may occur concurrently or sequentially. The measured parameter in the described method is the heating time period, which is compared to the stored time parameters; although other parameters related to power dissipation may be measured. As described above, the parameter measurement and thermistor heating occur separately, although they could occur simultaneously. In such an embodiment, either the heating voltage source is configured to be a heating current source or the voltage measurement to identify the parameter value measures a thermistor current instead.

The digital controller 192 contains error state protection to prevent the printer electronic controller from overfilling the reservoir 58 or letting the reservoir 58 run dry. For example, if the ink level thermistor 34 were to fail in the open state, current would not flow through the thermistor 34. Therefore, the circuit of FIG. 4 could not heat the thermistor 34 and the thermistor 34 voltage would be very great, i.e. almost reaching the source voltage 224. Thus, the digital controller 192 would determine that the circuit 150 was unable to stabilize the temperature of the thermistor 34 probe assembly at the threshold temperature. If the thermistor 34 were to fail in the open state during an ink level measurement cycle, the voltage dropped across the thermistor 34 would not fall to the threshold voltage $V_{thresh}$, because the circuit 150 would be unable to heat the thermistor 34 resulting in a lengthy heating time period. To compensate for this type of failure, the digital controller 192 contains a maximum heating time period, after which the digital controller 192 indicates an error has occurred. If the digital controller 192 records more than a predetermined number of maximum heating time periods, the digital controller 192 sets an open thermistor 34 flag, indicating to the printer controller that the thermistor 34 may not accurately indicate the ink level in the reservoir 58.

If the ink level thermistor 34 were to fail in the shorted state, the resistance of the thermistor 34 would be very low compared to its operational resistance level. As a result, the thermistor 34 voltage would be much lower than the threshold voltage. Therefore, even at the end of the measurement period the thermistor 34 voltage would not have reached the threshold voltage $V_{thresh}$, and the heating time period would not have been initiated. To compensate for this type of failure, the digital controller 192 includes a minimum heating time period. If the digital controller 192 records more than a predetermined number of minimum heating time periods, a thermistor 34 short flag is set, indicating to the printer controller that the thermistor 34 may not accurately determine the ink level in the reservoir 58.

The digital controller can also provide warm up feedback. Given the fact that this ink level sense method is thermal in nature, it can also be used to provide feedback to the rest of the system about the behavior of the ink inside the reservoirs during warm up events. While a printer is off, ink remains in the solid state. During warm up, ink temperature lags the reservoir temperature as indicated by the signal from the reservoir thermistor 30 (FIG. 5). Level sense thermistors can detect freeze/thaw transitions provided that they are in contact with the ink. This transition is manifested through instability of the level sense readings from measurement cycle to measurement cycle, but still within normal operational levels (i.e., neither shorted nor open). If thermistors are not in contact with ink, the measurement instability is minimal. Currently, printer software uses fixed timeouts that represent the necessary time coming out of each printer state (Low Power, Sleep, or Off) to sense the ink level in the print head reliably and make a determination with regard to dosing new ink.

It will be appreciated that variations of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

We claim:

1. A method for detecting ink in an ink reservoir comprising:
    dissipating power in a thermistor in an ink reservoir;
    controlling the power dissipated in the thermistor to maintain the thermistor at a temperature that is a fixed differential above a reservoir temperature;
    measuring a parameter that corresponds to the power dissipated in the thermistor; and
    comparing the measured parameter to at least one predetermined value to detect ink in the reservoir contacting the thermistor.

2. The method of claim 1, the dissipation of power in the thermistor further comprising:
    coupling a heating voltage to the thermistor.

3. The method of claim 2, the control of power dissipation in the thermistor further comprising:
    initiating a first predetermined time period during which a measurement current is coupled to the thermistor;
    initiating a second predetermined time period upon expiration of the first predetermined time period;
    comparing a voltage across the thermistor to a threshold voltage during the second predetermined time period;
    coupling the heating voltage to the thermistor upon detection of the thermistor voltage exceeding the threshold voltage during the second predetermined time period; and
    decoupling the heating voltage from the thermistor upon expiration of the second predetermined time period.

4. The method of claim 3 wherein the measured parameter is a time period during which the heating voltage is coupled to the thermistor.

5. The method of claim 1 further comprising:
    generating an ink reservoir low indicator in response to the comparison of the measured parameter to the at least one predetermined value indicating ink in the reservoir does not contact the thermistor.

6. The method of claim 3 further comprising:
    initiating the first predetermined time period upon the expiration of the second predetermined time period to form a periodic sequence of first and second predetermined time periods.

7. The method of claim 1, the control of the power dissipation in the thermistor further comprising:
    detecting a temperature of the thermistor; and
    adjusting the dissipated power in response to a comparison of the detected thermistor temperature to the fixed differential above the reservoir temperature.

8. The method of claim 7 wherein the dissipation of power in the thermistor and the detection of the thermistor temperature occur sequentially.

9. The method of claim 8, the detection of the thermistor temperature further comprising:
    detecting a voltage drop across the thermistor while a measurement current is flowing through the thermistor.

10. The method of claim 9, the adjustment of the dissipated power further comprising:
    coupling power to the thermistor upon the detected voltage drop exceeding a threshold voltage; and
    decoupling power from the thermistor at a subsequent predetermined time.

11. The method of claim 10 wherein the measured parameter that corresponds to the dissipated power is a measured time period during which power is coupled to the thermistor.

12. The method of claim 10, the coupling of power to the thermistor further comprising:
    coupling a heating voltage to the thermistor.

13. The method of claim 1 wherein the dissipation of power in the thermistor and the measurement of the parameter occur simultaneously.

14. An ink level detection system for use in a printer comprising:
    a thermistor positioned within an ink reservoir of a printer;
    a switch configured to couple a voltage to the thermistor in response to a control signal being received at the switch;
    a comparator having one input coupled to a voltage across the thermistor and another input coupled to a threshold voltage, the comparator generating the control signal received by the switch; and
    a digital controller coupled to the comparator and configured to measure a parameter corresponding to a dissipation of electrical power in the thermistor during a predetermined time period and to compare the measured parameter to at least one predetermined value to detect ink in the reservoir contacting the thermistor.

15. The system of claim 14, the digital controller being further configured to ground the control signal electrically and turn off the switch for a first predetermined time period and, following expiration of the first predetermined time period, to measure a heating time period that commences in response to the voltage across the thermistor exceeding the threshold voltage and that terminates upon the expiration of a second predetermined time period, the second predetermined time period commencing in response to the first predetermined time period expiring, the heating time period being the measured parameter that corresponds to the dissipation of electrical power in the thermistor.

16. The ink level detection system of claim 14 further comprising:
    a reference thermistor, the reference thermistor configured to generate a voltage corresponding to an operating temperature of the ink reservoir; and
    the digital controller being further configured to generate the threshold voltage by converting a sum of a predetermined temperature differential and the operating temperature of the ink reservoir to a voltage.

17. The ink level detection system of claim 15 further comprising:
    a memory configured to store a plurality of known heating time periods; and
    the digital controller being further configured to compare the measured heating time period to the known heating time periods stored in the memory to detect ink in the ink reservoir contacting the thermistor.

18. The ink level detection system of claim 14 wherein the measured parameter is a measured time period during which the voltage is coupled to the thermistor by the switch.

19. The ink level detection system of claim 18, the digital controller being further configured to average a predetermined number of measured time periods and to compare the averaged time period to the at least one predetermined value.

20. The ink level detection system of claim 14 further comprising:
a second thermistor coupled to the ink reservoir to enable the second thermistor to detect an operating temperature of the ink reservoir; and
the digital controller being coupled to the second thermistor and further configured to generate the threshold voltage with reference to the operating temperature by the second thermistor.

* * * * *